United States Patent
Dorner

(10) Patent No.: US 6,269,930 B1
(45) Date of Patent: Aug. 7, 2001

(54) APPARATUS FOR PERSONALIZING IDENTIFICATION CARDS

(75) Inventor: Frank Dorner, Vienna (AT)

(73) Assignee: Kunz GmbH, Vienna (AT)

( * ) Notice: Subject to any disclaimer, the term of this patent is extended or adjusted under 35 U.S.C. 154(b) by 0 days.

(21) Appl. No.: 09/389,791

(22) Filed: Sep. 3, 1999

(30) Foreign Application Priority Data

Sep. 7, 1998 (DE) .............................. 198 40 811

(51) Int. Cl.$^7$ .............................. G06K 13/07; B41J 2/32; H05K 3/00; B65G 47/80; B65H 15/00
(52) U.S. Cl. .......................... 198/346.2; 198/379; 29/837
(58) Field of Search ................ 198/346.2, 379; 29/837

(56) References Cited

U.S. PATENT DOCUMENTS

| | | | |
|---|---|---|---|
| 5,078,257 | * | 1/1992 | Carter, Jr. ............... 198/369 X |
| 5,208,976 | * | 5/1993 | Bess et al. ............... 29/837 |
| 5,310,039 | * | 5/1994 | Butera et al. ............ 198/346.2 |
| 6,142,370 | * | 11/2000 | LaManna et al. ........ 235/380 |

FOREIGN PATENT DOCUMENTS

| | | | |
|---|---|---|---|
| 195 14 999 | | 10/1996 | (DE) . |
| 196 44 306 | | 5/1998 | (DE) . |
| 0 597 135 A1 | * | 11/1992 | (EP) .............................. G06K/13/02 |
| 0 597 135 | | 5/1994 | (EP) . |
| 0 698 859 A1 | * | 8/1995 | (EP) .............................. G06K/19/18 |
| 2 442 482 | | 6/1980 | (FR) . |
| WO 86/06855 | * | 11/1986 | (WO) ............................ G06K/13/07 |
| WO 98/24632 | * | 12/1997 | (WO) ............................ B41J/2/32 |
| WO 00/16235 | * | 9/1999 | (WO) ............................ G06K/1/00 |

\* cited by examiner

*Primary Examiner*—Christopher P. Ellis
*Assistant Examiner*—Kenneth W Bower
(74) *Attorney, Agent, or Firm*—Flynn, Thiel, Boutell & Tanis, L.L.P.

(57) ABSTRACT

An apparatus for the personalization of identification cards (8) with integrated circuits (35) consisting of at least one personalizing station, for example printing stations (2, 3), furthermore a rotor (1) with a card transport device (16). Around the rotor (1) are laid out contacting devices (31a–m) in a stationary position for loading the integrated circuits (35) of the cards (8) each of which contacting devices is fitted with a card transport device (32) to pick up the cards (8) fed by the card transport device (16) of the rotor (1) and to return them after loading (1) of the integrated circuits (35) to the rotor (1). The rotor (1) is fitted with a contacting device (38) for test reading the integrated circuits (35).

5 Claims, 2 Drawing Sheets

APPARATUS FOR PERSONALIZING IDENTIFICATION CARDS

Figure 1:
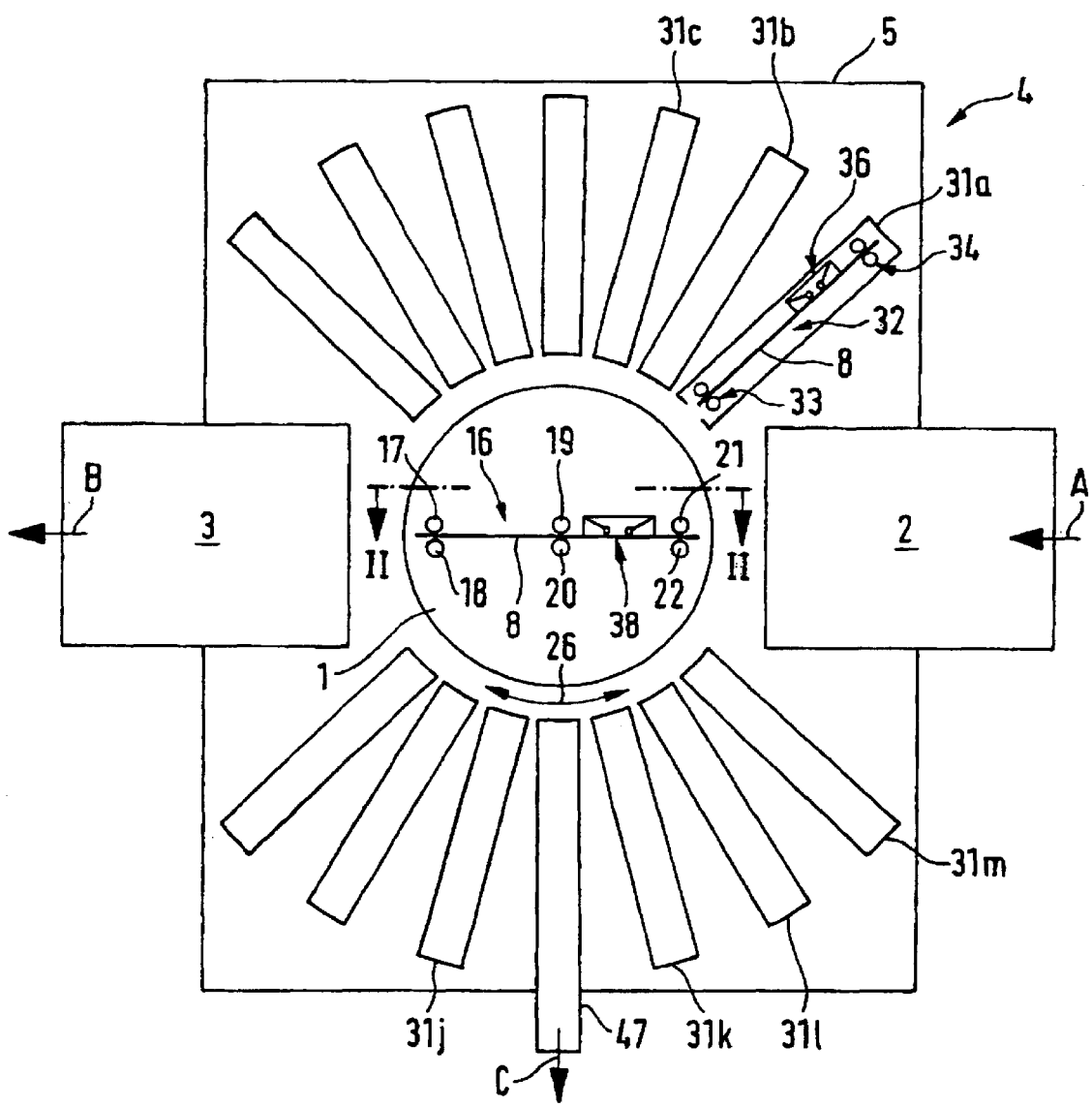

The invention refers to an apparatus for personalizing identification cards with integrated circuits as per the preamble of claim 1.

This type of apparatus is known from DE 196 44 306 Al. The personalizing station consists of a printing station which allows imprinting identification cards with integrated circuits, so-called chip cards, as per ISO7816-2. The rotor serves to turn the cards to allow printing on both sides. While printing takes only a few seconds, chip loading is more time-intensive. To make good use of the card-turning time, the above apparatus has several contacting devices installed on the rotor which allow the loading of chips at same time the cards are being turned.

To feed the cards to the individual contacting devices, the above apparatus requires a corresponding number of card transport devices on the rotor. The power supply to the motors of the card transport devices and of the contacting devices thus requires a large number of electrical lines which restrict the mobility of the rotor. The number of contacting devices is therefore limited so that the time for loading the chips is in the final analysis limited by the output speed of the cards, especially when large quantities are data need to be loaded, as for example with processor chips.

EP 0 597 135 Al describes a device for the reading and writing to magnetic cards with a rotor, along whose circumference is provided a pocket for the coding of magnetic strips, and with chip cards one more pocket with a chip reading station The problem of the invention is to substantially increase the output speed of personalized identification chip cards in a simple manner.

This is achieved by the invention with the apparatus described in claim 1. The subclaims describe further advantageous developments of the invention.

In the apparatus as per the invention, the contacting devices for the loading of the chips are arranged in a stationary position along the circumference of the rotor. The rotor thus forms a type of rotary disk for transporting the cards to the individual contacting devices for loading the chips.

To transport the cards from the rotor to the individual contacting devices and return them after loading from the contacting devices to the rotor, each contacting device is assigned a card transport device. It is possible to use commercially available units which draw in the chip card, load it and eject it after loading. The transport of the chip cards inside these devices can be controlled by sensors.

Due to the stationary nature of the array, the electrical lines for the power supply to the motors of the card transport devices, of the chip contacting devices and of the sensors can be laid without problem.

The card transport direction of the chip loading devices extends radially. This allows a large number of chip loading devices to be radially arranged around the rotor and permits making the loading time a corresponding multiple of the processing time of each card in subsequent personalizing stations, for example a multiple of the card printing time in the printing station or stations.

The apparatus of the invention therefore allows to load large quantities of data into memory chips, also and in particular programs into processor chips.

While the fixed chip contacting devices are arranged along the circumference of the rotor, in the apparatus of the invention the subsequent contacting device on the rotor is used for test reading the chips.

Test reading can be performed in different ways. For example the chips with the contacting devices on the rotor can be tested before being programmed by the chip contacting devices installed fixed around the rotor.

In this way, unusable cards can be determined. These may be cards, for example, with a defective chip or a card with a type of chip not compatible with the personalizing apparatus. The unusable card can be extracted using an ejection device arranged in a stationary position along the circumference of the rotor and thus be excluded from subsequent processing by the apparatus of the invention.

After the chips are loaded by the chip loading units arranged around the rotor, the test reading device at the rotor permits reading the data on the chips. The read data can then be used to verify whether the chips have been correctly loaded, in particular for the purpose of coordinating the chip data with the data from at least one other subsequent personalizing station.

The other data may, for example, be graphic and/or magnetically stored data. Thus, the subsequent personalizing station may be a printing station which imprints the card with the personal data and/or a picture of the card holder.

An embossing apparatus may be provided for imprinting alphanumeric data on the card to project from the card.

The printing station can furthermore be made up of a thermal printing head which consists of heating elements arranged in a row and running perpendicular to the card transport device and which can be individually computer-operated. The individual speed of the card transport device is provided with a step motor which moves the card along the row of heating elements at a step rate that corresponds to the number of heating elements.

The card can also be provided with a thermally sensitive layer or a colour transfer film may be provided which is moved along between the card and the thermal printer head. The thermal printer head of this type allows to imprint both numerical data and a picture of the card holder onto the card.

When the identification card contains a magnetic strip, the subsequent personalizing station may also be a coding station for programming the magnetic card.

Thus, the chip test reading device at the rotor of the apparatus of the invention serves in particular for verifying the correspondence of the personal data of the chips loaded by the chip loading devices with the card data, printed or to be printed and/or coded. The test reading apparatus needs to read only a small portion of the data on the chips to verify their correspondence with the printing and/or coding station, for example. The time needed for test reading the chips is therefore correspondingly short.

After the return transport from the chip loading devices to the rotor, the cards are turned by the rotor into the direction of the personalizing station or stations or ejection unit to be thereafter transported by the card transport apparatus on the rotor to the neighbouring personalizing station or stations or ejection unit.

The time for turning the cards is sufficient for the test reading by the chip contacting device of the rotor. The test reading does therefore not affect the output speed of the cards.

Moreover, as in the apparatus of the invention, the loading time in the chip loading devices arranged around the rotor is a multiple of the processing time of the cards in subsequent personalizing stations, for example the printing station or the magnetic card coding station, the invention makes it possible to load large quantities of data with the chip loading devices and to test read the chips. Inspite of this fact, the output speed of the cards is substantially raised, possibly in such a way that the card output speed is no longer determined by the loading of the chips but by the processing of the cards in subsequent personalizing stations, like the printing station or magnetic strip coding station.

When at least one other personalizing station is arranged after the rotor, the chip cards can be directly fed to the rotor which will then refeed them one by one, i.e. to the individual chip loading apparatuses arranged around it.

However, the subsequent personalizing station, or when there are several personalizing stations, one of these, can also be arranged before the rotor. Thus, a printing station may be provided before the rotor, for example. The rotor can then be used for turning the card by 180 degrees which allows imprinting the card by this printing station on both sides, as described in detail DE 195 14 999 C2. Another possible setup is to arrange one printing station before and one printing station after the rotor so that the card can be printed by one printing station on the one side and, after turning by the rotor, by the other printing station on the other side.

Thus, the card can be turned by the rotor for further processing. The turning of the card by the rotor may also be done merely for the purpose of onward transport, for example to stack or deposit the completed personalized card in the output station in a certain manner, for example with the front side facing up or down.

Identification cards in the sense of the invention are both identity cards, i.e. cards which identify the holder or certify him to be a member of a certain group, as well as access cards, i.e. cards which entitle the holder to claim certain services.

As an example, one of the versions of the apparatus of the invention is explained below by way of example in greater detail in conjunction with the drawing. The drawing shows schematically FIG. 1: a longitudinal section of the apparatus FIG. 2: a partial reproduction of a section along Line II—II of FIG. 1; and FIG. 3: a partial view of the rotor as per FIG. 1

As per FIG. 1, rotor 1 is arranged between two printing stations 2 and 3. As shown in particular in FIG. 2, the rotor 1 is pivoted with shaft 7 between lateral walls 5 and 6 of casing 4. I.e., rotor 1 is can be rotated around an axis which is positioned in the card plane perpendicular to the longitudinal axis of card 8. Rotor 1 is powered by step motor 9.

Rotor 1 incorporates two disk-shaped lateral walls 11 and 12 which are interconnected by Struts 13. Lateral Walls 11 and 12 of rotor 1 are provided on their inner sides with grooved tracks 14 and 15 into which card 8 engages with its longitudinal edges.

The transport of card 8 in rotor 1 is provided by card transport device 16. The card transport device 16 consists, for example, of three pairs of rolls 17, 18; 19, 20 and/or 21, 22 on the one side and/or the opposite side of card 8. Rolls 17 to 22 are powered by a motor, not shown, attached to rotor 1 via sprocket gear 23, schematically shown in FIG. 2.

Paired rolls 21 and 22 pick up card 8 when the card leaves printing station 2 after having been imprinted on its upper side by printing station 2.

Card transport device 16 thus moves Card 8 in radial direction of rotor 1 in either direction. Rotor 1 carries sensors 24 and 25, for example light barriers, at both end of card transport device 16.

Rotor 1 can be rotated with motor 9 in both directions shown by the two-headed arrow 26 (FIG. 1).

In the position shown in FIG. 1, card transport device 16 of rotor 1 points with one end at printing station 2 in such a way that card 8 can be fed from printing station 2 to rotor 1. This rotary position of rotor 1 can be defined as its basic position from which the control and speed of the rotation of rotor 1 is performed with step motor 9.

Figure 2:
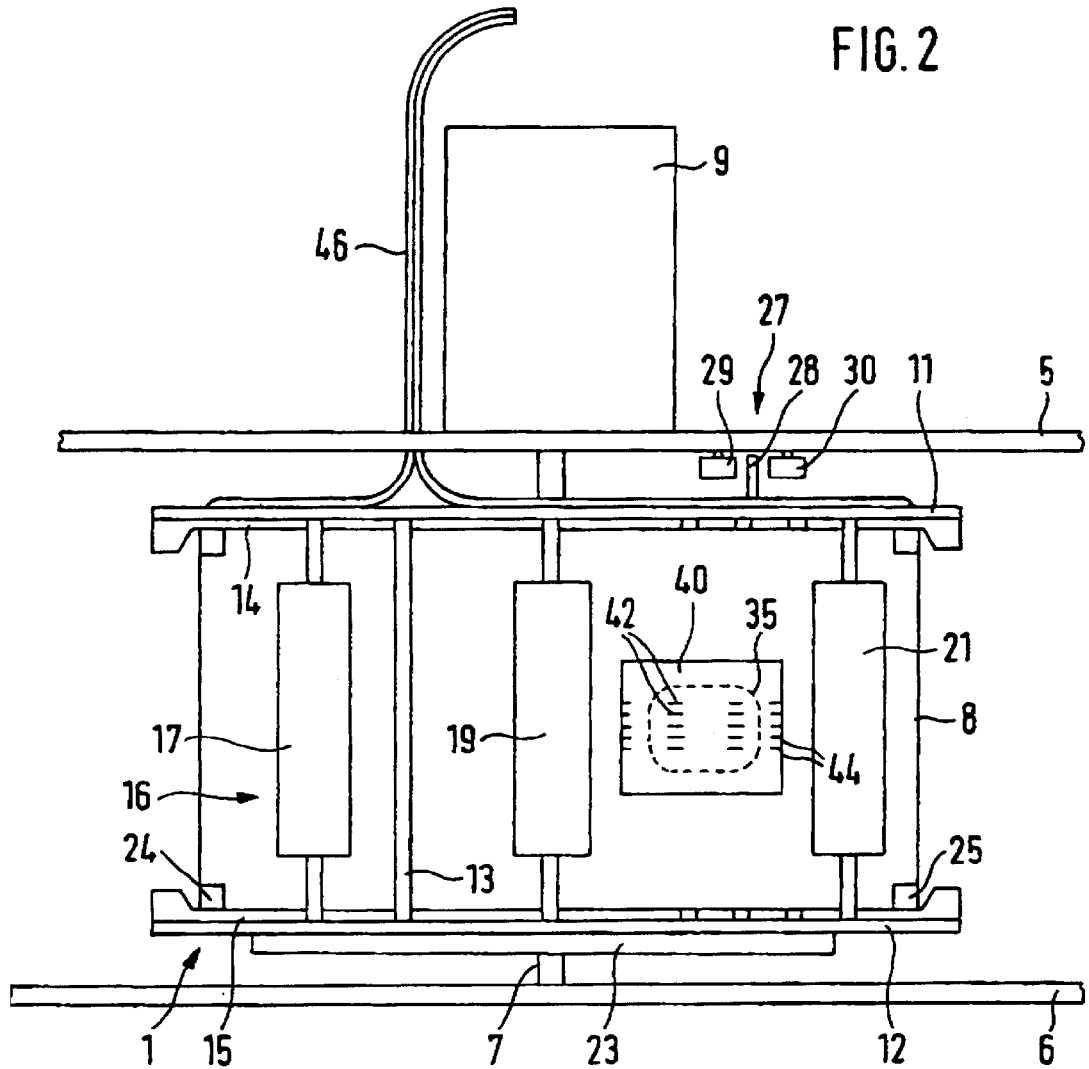

To define this basic position, a device 27 is provided which as shown in FIG. 2 consists for example of a projection 28 on lateral wall 11 of rotor 1 and a light barrier with light source 29 and a photocell 30 on casing wall 5.

As per FIG. 1, a large number of chip loading devices 31a–m is arranged around rotor 1 and face away radially from rotor 1.

Figure 3:
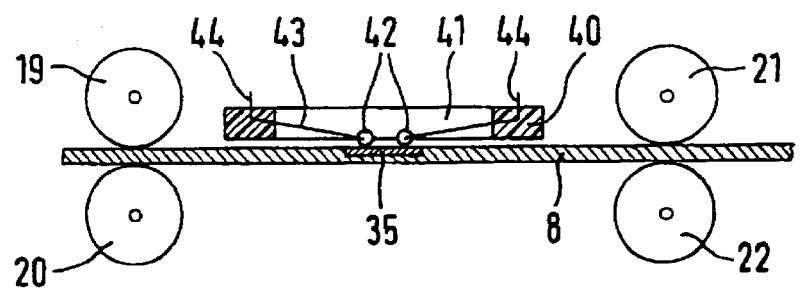

Chip loading stations 31a–m are attached between the two walls 5 and 6 of casing 4, i.e. in a stationary position. As all are of the same shape, only chip loading station 31a is shown in greater detail in FIG. 1. Accordingly, each chip loading station 31a–m features a card transport device 32 which is essentially shaped in the same way as card transport device 16 of rotor 1. I.e., card transport device 32 of chip loading station 31a–m features pairs of rolls 33 and 34 which are arranged on one and/or the other side of card 8 and driven by a gear, not shown, powered by a motor, not shown, in order to pick up card 8 from rotor 1 and draw it in and return it to rotor 1 in the opposite direction after loading of chip 35 on card 8 (FIG. 3).

For the loading of chips 35, each Station 31a–m is equipped with a contacting device 36 for loading which may have the form of contacting device 38 on rotor 1 for test reading, which is shown in greater detail in particular in FIG. 3 and will be explained below.

Each chip loading station 31a–m may, moreover, carry sensors, not shown, for example contacts, which determine the position, for example the final position of card 8 in the current chip loading station 31a–m, in which the loading of chips 35 takes place.

As shown in FIG. 2, rotor 1 has a contacting device for reading chips 35. A shown in FIGS. 2 and 3, contacting device 38 consists of a plate 40, of plastic for example, in which Chip Contacts 42 are located on spring-loaded arms 43 inside slots 41 which extend in card feeding direction. Arms 43 are equipped with contacts 44 which are connected to the computer system, not shown, employed to operate contacting device 38.

The electrical lines for the supply of the electrical devices on rotor 1 are bundled into cable bundle 46 which turns together with rotor 1.

On the lower side of rotor 1 between walls 5 and 6 of casing 1 is installed a pocket 47 into which unusable or incorrectly loaded cards can be ejected into a container not shown.

The unprinted and unloaded chip blanks are fed to printing station 2 in the direction of arrow A. At the beginning of the personalizing process, a card printed on one side by printing station 2 is fed to rotor 1 in the basic position shown in FIG. 1, i.e. it is drawn in by card transport device 16 of rotor 1.

Rotor 1 is rotated by step motor 9 which in turn is controlled by the computer system in order to feed card 8 to the next following empty chip loading station, for example 31a, by activating card transport device 16 of the rotor and to card transport device 32 of chip loading station 31a. Rotor 1 then returns to its basic position and the process is repeated as often as needed until all chip loading stations 31a–m have been supplied with cards 8 where they are loaded under the control of the computer system.

For further processing, for example for printing the reverse side of card 8 with printing station 3, Rotor 1 is rotated to chip loading station 31a with the first inserted card 8 and card 8 with loaded chip 35 is then returned from chip loading station 31*a* on rotor 1 by activating card transport device 32 and card transport device 16. Rotor 1, controlled by step motor 9, is then rotated such that card 8 is fed by printing station 3 after being turned. During the rotation of rotor 1, chip 35 of card 8 is read by contacting device 38 on rotor 1 by the computer system and, when the read data are correct, printing station 3 is correspondingly instructed by the computer system to print the turned-around card 8.

Thereafter, the empty chip loading station 31*a* is fed a new card 8 by printing station 2 through rotor 1 for the loading of chip 35 whereupon card 8 with the loaded chip 35 is extracted from the neighbouring chip loading station 31*b* by rotor 1 which then turns it and feeds it to printing station 3 for printing of the reverse side. From there, the finished card 8 is transferred to the output station in the direction of arrow B. These steps are repeated as often as cards need to be personalized.

If a card 8 proves defective on test reading with the contacting device 38 on rotor 1, it is ejected into a pocket 47 in the direction of arrow C. Cards 8 can also be test read by contacting device 38 before being fed to a chip loading station 31*a–m* so that any cards 8 with defective or unusable chips 35 can be ejected via Pocket 47.

What is claimed is:

1. An apparatus for the personalization of identification cards with integrated circuits, the apparatus including: a rotor that can be rotated around a rotary axis perpendicular to the longitudinal axis of an identification card and that has a card transport device; a plurality of contacting devices for simultaneously loading data into the integrated circuits of the identification cards; and at least one personalizing station, wherein:

said contacting devices for loading data into the integrated circuits are installed in stationary positions around the circumference of the rotor and each said contacting device is equipped with a card transport device which transports the identification card fed by the card transport device of the rotor and returns the identification card after the loading of the data to the card transport device of the rotor; and the rotor is provided with at least one supplement contacting device for test reading the integrated circuits on the identification cards.

2. The apparatus of claim 1, wherein the rotary drive of the rotor is in the form of a step motor.

3. The apparatus of claim 1, wherein a device is provided to determine the basic rotary position of the rotor.

4. The apparatus of claim 1, wherein an ejection device for unusable or incorrectly loaded cards is provided along the circumference of the rotor.

5. The apparatus of claim 1, wherein the rotor is equipped for turning the cards.

* * * * *